2,895,826

PHOTOGRAPHIC COLOR COUPLERS CONTAINING FLUOROALKYLCARBONAMIDO GROUPS

Ilmari F. Salminen, Charles R. Barr, and Anthony Loria, Rochester, N.Y., assignors to Eastman Kodak Company, Rochester, N.Y., a corporation of New Jersey No Drawing. Application October 8, 1956
Serial No. 614,361

19 Claims. (Cl. 96—55)

This invention relates to coupler compounds of use in color photography, which compounds contain a perfluoroalkylcarbonamido group conferring desirable light absorption properties and stability upon dyes obtained therefrom in the photographic process of colorforming development.

The coupler compounds of the invention include all kinds of coupler compounds capable of forming dyes with the oxidation product of primary aromatic amino silver halide developing agents, the perfluoroalkylcarbonamido group being attached to the coupler molecule in a non-coupling position. For example, in the phenolic hydroxyl coupler compounds including the phenols and naphthols, the fluorine-containing group may be in the 2-position of the nucleus and in the 5-pyrazolone couplers may be attached in the 3-position of the pyrazolone nucleus.

A very useful group of couplers of the invention containing the perfluoroalkylcarbonamido group are those having the following general formula:

$$R-NH-CO-C_nF_{2n+1}$$

wherein R represents a coupler group such as a pyrazolone group free to react with the oxidation product of a primary aromatic amino silver halide developing agent to form a dye, and $n$ represents a positive integer of from about 1 to 13.

The coupler compounds of the invention containing the fluoroalkylcarbonamido group produce with oxidized color developing agents dye images which have unusual light absorption characteristics as well as improved heat stability. That is, it has been shown (Salminen et al. U.S. patent application Serial No. 466,570, filed November 3, 1954) that if the 2-acylaminophenol couplers are substituted in the 5-position with, for example, an acylamino group, cyan dyes obtainable therefrom have improved heat stability. However, it is desirable to obtain from such cyan couplers dyes in which the light absorption is shifted somewhat toward the longer wavelengths of the spectrum. The usual means for obtaining this shift in light absorption is to introduce a halogen atom into the phenol nucleus, for example, in the 6-position. However, the result is to obtain a decrease in heat stability in the dye images obtained from, for example, the 2-acylamido-6-chloro-5-substituted phenolic couplers.

We have discovered that if couplers of well known types are substituted with the fluoroalkylcarbonamido group of the nature indicated above, not only is the light absorption of the dyes derived from phenolic couplers shifted in the desired direction but also the heat stability of dyes from all types of couplers containing the fluoroalkylcarbonamido group is greatly improved. For example, the following dyes obtainable by means of color-forming development illustrate the improved shift in light absorption attributable to the fluorine-containing group.

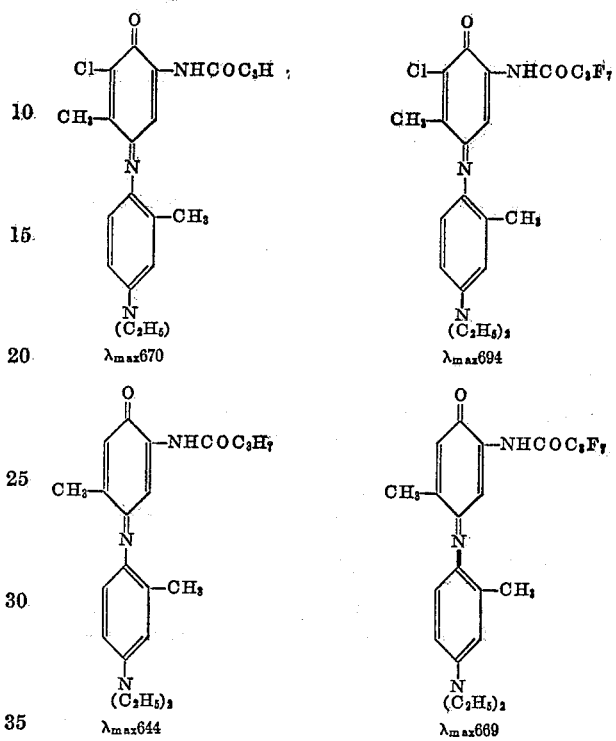

Similarly, the dyes obtained in color development from the coupler VII (1-phenyl-3-heptafluorobutyramido-5-pyrazolone) described hereinafter, have absorption maxima at a higher wavelength than comparable dyes obtained from the coupler 1-phenyl-3-dichloroacetamido-5-pyrazolone. Similar effects are obtained with the open-chain reactive methylene couplers containing the fluoroalkylcarbonamido group.

One object of our invention is therefore to provide novel couplers containing the fluoroalkylcarbonamido group, which couplers have improved light absorption properties and heat stability. Other objects include providing photographic emulsions and color developing compositions containing the mentioned couplers as well as representative photographic color processes in which the emulsions are developed in the presence of the novel coupler compounds.

Representative couplers useful in our invention and containing the fluoroalkylcarbonamido group are the following:

(I)

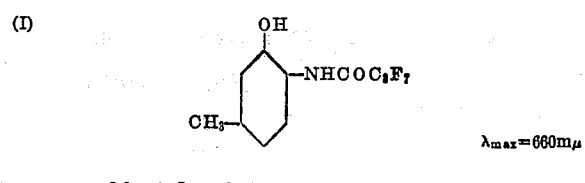

2-heptafluorobutyramido-5-methyl phenol

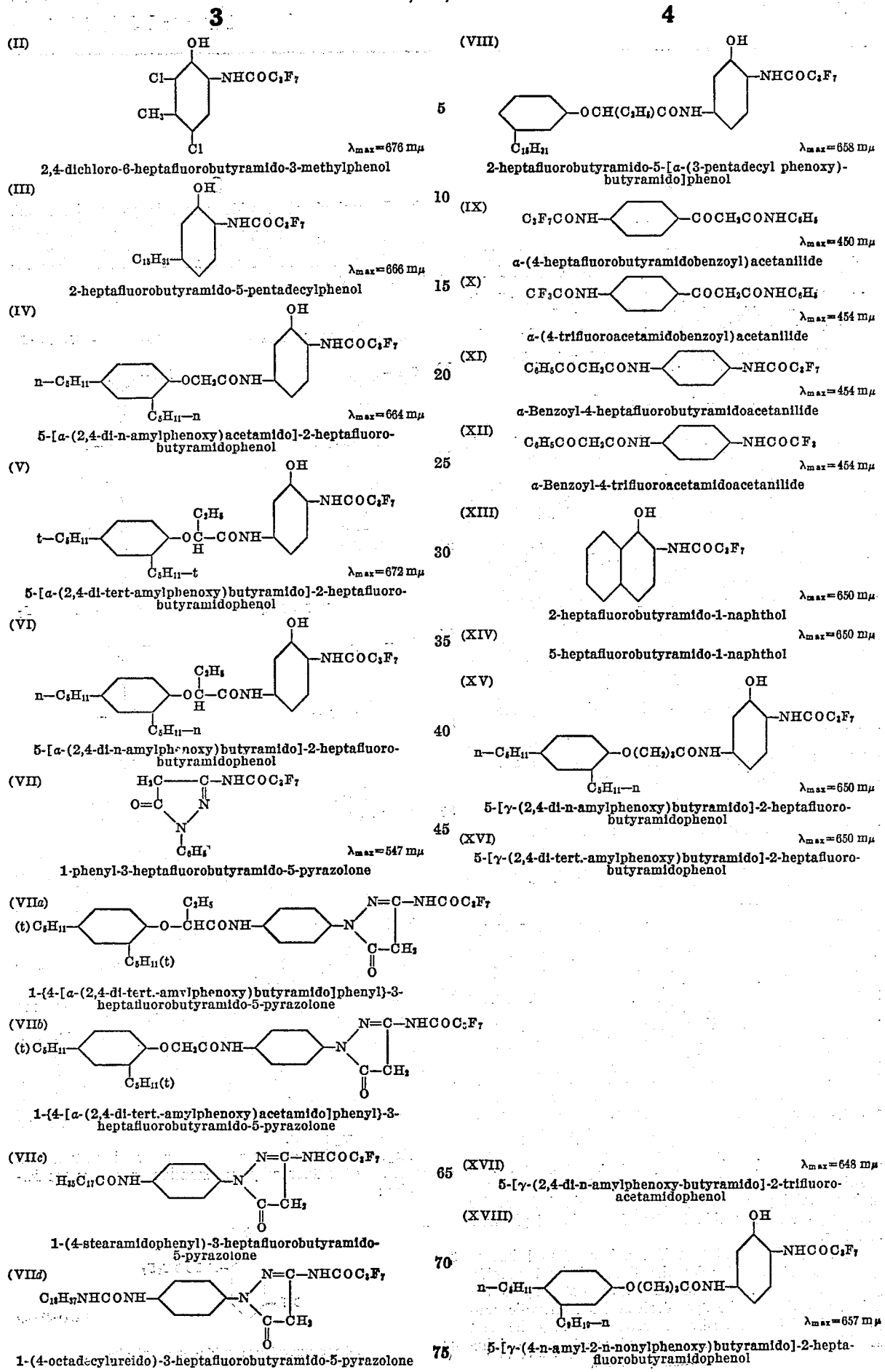

The "$\lambda_{max}$" values appearing after the above coupler formulas refer to the wavelength of maximum absorption of dyes obtained by oxidative coupling of the particular coupler with 2-amino-5-diethylaminotoluene hydrochloride.

The above coupler compounds can be synthesized as follows:

COUPLER I

To a solution of 6 parts of 2-amino-5-methylphenol (Beil., XIII, 590) and 13 parts of quinoline in 100 volumes of dioxane was added a solution of 12 parts of heptafluorobutyryl chloride in 25 volumes of dioxane. The temperature rose from 23° to 45°. The clear reaction mixture was left standing at room temperature overnight. It was poured into 500 volumes of dilute hydrochloric acid. The solid product was collected, recrystallized from 50 volumes of ligroin and dried.

COUPLER II

To a solution of 10 parts of 6-amino-2,4-dichloro-3-methylphenol and 13 parts of quinoline in 100 volumes of dioxane was added a solution of 12 parts of heptafluorobutyryl chloride in 25 volumes of dioxane. The temperature rose from 24° to 45°. The clear reaction mixture was left standing at room temperature overnight. It was poured into 500 volumes of dilute hydrochloric acid. The solid product was collected, recrystallized from 200 volumes of ligroin and dried.

COUPLER III

To a solution of 6.4 parts of 2-amino-5-pentadecylphenol and 5 parts of quinoline in 100 volumes of dioxane was added a solution of 4.7 parts of heptafluorobutyryl chloride in 25 volumes of dioxane. The temperature rose from 26° to 35° C. The clear reaction mixture was left standing at room temperature overnight. It was poured into 500 volumes of dilute hydrochloric acid. The solid product was collected, recrystallized from 150 volumes of acetonitrile and dried.

2-amino-5-pentadecylphenol

A mixture of 25 parts of 2-nitro-5-pentadecylphenol and 2 parts of Raney nickel catalyst in 250 volumes of ethyl acetate was reduced at 50 lb. hydrogen pressure in the Parr hydrogenation apparatus. Nickel was removed by filtration and the product was isolated by chilling the filtrate in an ice bath.

COUPLER IV

To a solution of 22 parts of 5-amino-2-heptafluorobutyramidophenol and 18 parts of quinoline in 250 volumes of dioxane was added a solution of 21 parts of α-(2,4-di-n-amylphenoxy-acetyl)-chloride in 40 volumes of dioxane. The temperature rose from 27° to 36°. The clear reaction mixture was stirred for 2 hours at room temperature. It was poured into 1000 volumes of dilute hydrochloric acid. The solid product was collected, recrystallized from 200 volumes of acetonitrile and dried.

2-heptafluorobutyramido-5-nitrophenol

To a solution of 10.5 parts of 2-amino-5-nitrophenol (Beil., 13, 390; also J.C.S., 822 (1926)) and 18 parts of quinoline in 100 volumes of dioxane was added a solution of 16 parts of heptafluorobutyryl chloride in 25 volumes of dioxane. The temperature rose from 25° to 50°. The clear reaction mixture was left standing at room temperature overnight. It was poured into 500 volumes of dilute hydrochloric acid. The solid product was collected and dried.

5-amino-2-heptafluorobutyramidophenol

A mixture of 22 parts of 2-heptafluorobutyramido-5-nitrophenol and 2 parts of Raney nickel catalyst in 250 volumes of dioxane was reduced at 50-lb. hydrogen pressure in the Parr hydrogenation apparatus. Nickel was removed by filtration and the filtrate was used as such without isolation of the amine.

COUPLER V

To a solution of 7.3 parts of 5-amino-2-heptafluorobutyramidophenol and 6 parts of quinoline in 100 volumes of dioxane was added a solution of 8 parts of α-(2,4-di-tert-amylphenoxy)butyryl chloride in 30 volumes of dioxane. The temperature rose from 25° to 31°. The clear reaction mixture was left standing at room temperature overnight. It was poured into 500 volumes of dilute hydrochloric acid. The solid product was collected, recrystallized from 50 volumes of acetonitrile and dried.

COUPLER VI

To a solution of 24 parts of 5-amino-2-heptafluorobutyramidophenol and 20 parts of quinoline in 250 volumes of dioxane was added a solution of 26 parts of α-(2,4-di-n-amylphenoxy)butyryl chloride in 50 volumes of dioxane. The temperature rose from 26° to 36°. The clear reaction mixture was left standing at room temperature overnight. It was poured into 1000 volumes of dilute hydrochloric acid. The product was collected and recrystallized from 100 volumes of acetonitrile.

COUPLER VII

To 30 volumes of acetonitrile were added 1.7 parts of 1-phenyl-3-amino-5-pyrazolone, and 1.2 parts of N,N-dimethylaniline. To the stirring mixture was added 4.5 parts of heptafluorobutyryl chloride; the temperature rose from 26° to 43° C. The mixture was stirred on a steam bath for an additional hour and allowed to stand overnight. The reaction was precipitated into 200 volumes of ice water, solid collected, washed, and suspended for 1 hour at room temperature in 50 volumes of a solution made up of 8 parts sodium hydroxide, 15 volumes of water, and 125 volumes of ethyl alcohol. The excess base was neutralized with acetic acid and the mixture drowned in 200 volumes of water. The solid was collected, washed, and recrystallized from 30 volumes of benzene.

COUPLER VIII

To a solution of 8 parts of 5-amino-2-heptylfluorobutyramidophenol and 6.5 parts of quinoline in 300 volumes of dioxane, was added at 25° C., with stirring, a solution of 10.2 parts of α-(3-pentadecylphenoxy)butyryl chloride in 40 volumes of dioxane. The temperature rose to 28° C., and a clear solution resulted. The clear reaction mixture was stirred at room temperature for one-half hour, poured into 1000 volumes of dilute hydrochloric acid, the solid product collected, recrystallized from acetonitrile and dried. The melting point was 71–72° C.

COUPLER IX

To a solution of 6.35 parts of α-(4-aminobenzoyl) acetanilide and 4 parts of sodium acetate in 50 volumes of glacial acetic acid was added a solution of 5.8 parts of heptafluorobutyryl chloride in 20 volumes of glacial acetic acid. The temperature rose from 23° to 34° C. The clear reaction mixture was left standing at room temperature for 1 hour and was poured into 500 volumes of water. The solid product was collected, recrystallized from 500 volumes of toluene and dried.

COUPLER X

To a solution of 6.35 parts of α-(4-aminobenzoyl) acetanilide and 4 parts of sodium acetate in 50 volumes of glacial acetic acid was added a solution of 5.25 parts of trifluoroacetic anhydride in 20 volumes of glacial acetic acid. The temperature rose from 28° to 39° C. The clear reaction mixture was left standing at room temperature for 1 hour, then was poured into 500 volumes of water. The solid product was collected, recrystallized from 150 volumes of acetonitrile and dried.

COUPLER XI

To a solution of 6.35 parts of α-benzoyl-4-amino-acetanilide and 4 parts of sodium acetate in 75 volumes of glacial acetic acid was added a solution of 5.8 parts of heptafluorobutyryl chloride in 20 volumes of glacial acetic acid. The temperature rose from 25° to 34° C. The clear reaction mixture was left standing at room temperature for 1 hour. It was poured into 500 volumes of water. The solid product was collected, recrystallized from 600 volumes of toluene and dried.

COUPLER XII

To a solution of 6.35 parts of α-benzoyl-4-amino-acetanilide and 4 parts of sodium acetate in 50 volumes of glacial acetic acid was added a solution of 5.25 parts of trifluoroacetic anhydride in 20 volumes of glacial acetic acid. The temperature rose from 26° to 32°. The clear reaction mixture was left standing at room temperature for 1 hour. It was poured into 500 volumes of water. The solid product was collected, recrystallized from 135 volumes of ethyl alcohol and dried.

COUPLER XIV

To a solution of 3.18 parts of 5-amino-1-naphthol and 5 parts of quinoline in 50 volumes of dioxane was added a solution of 4.65 parts of heptafluorobutyryl chloride in 20 volumes of dioxane. The temperature rose from 27 to 42° C. The clear reaction mixture was left standing at room temperature for one hour. It was poured into 300 volumes of dilute hydrochloric acid. The solid product was collected, recrystallized from 70 volumes of toluene and dried.

The melting point was 200–201° C.

COUPLER XV

To a solution of 9.6 parts of 5-amino-2-heptafluorobutyramidophenol and 7.8 parts of quinoline in 170 volumes of dioxane was added a solution of 10.15 parts of γ-(2,4-di-n-amylphenoxy)-butyryl chloride in 50 volumes of dioxane. The temperature rose from 23° C. to 31° C. The clear reaction mixture was left standing at room temperature for one hour. It was then poured into 1000 volumes of dilute hydrochloric acid. The solid product was collected, recrystallized from 100 volumes of ligroin and dried. The melting point was 125–126° C.

COUPLER XVI

To a solution of 9.6 parts of 5-amino-2-heptafluorobutyramidophenol and 7.8 parts of quinoline in 200 volumes of dioxane was added a solution of 10.15 parts of γ-(2,4-di-tert.-amylphenoxy)-butyryl chloride in 50 volumes of dioxane. The temperature rose from 22° C. to 32° C. The clear reaction mixture was left standing at room temperature for one hour. It was poured into 1000 volumes of dilute hydrochloric acid. The solid product was collected, recrystallized from 300 volumes of ligroin and dried. The melting point was 174–175° C.

COUPLER XVII

5-nitro-2-trifluoroacetamidophenol

To a solution of 46 parts of 2-amino-5-nitrophenol and 78 parts of quinoline in 400 volumes of dioxane was added a solution of 63 parts of trifluoroacetic anhydride in 100 volumes of dioxane. The temperature rose from 22 to 55° C. The clear reaction mixture was then left standing at room temperature for 1 hour. It was then poured into 3000 volumes of dilute hydrochloric acid. The solid product resulting was collected and dried. The melting point was 159–160° C.

5-amino-2-trifluoroacetamidophenol

A mixture of 7.5 parts of 5-nitro-2-trifluoroacetamidophenol and 2 parts of Raney nickel catalyst in 125 volumes of dioxane was reduced at 50 lb. hydrogen pressure in the Parr hydrogenation apparatus. Nickel was removed by filtration and the filtrate was used as such without filtration of the amine.

To a solution of 6.6 parts of 5-amino-2-trifluoroacetamidophenol and 7.8 parts of quinoline in 180 volumes of dioxane was added a solution of 10.15 parts of γ-(2,4-di-tert.-amylphenoxy)-butyryl chloride in 40 volumes of dioxane. The temperature rose from 23 to 29° C. The clear reaction mixture was left standing at room temperature for 1 hour. It was then poured into 1000 volumes of dilute hydrochloric acid. The solid product was then collected, recrystallized from 50 volumes of acetonitrile and dried. The melting point was 219–220° C.

COUPLER XVIII

To a solution of 6.4 parts of 5-amino-2-heptafluorobutyramidophenol and 5.16 parts of quinoline in 180 volumes of dioxane was added a solution of 7.9 parts of γ-(4-n-amyl-2-n-nonylphenoxy)-butyryl chloride in 30 volumes of dioxane. The temperature rose from 26 to 32° C. The clear reaction mixture was left standing at room temperature one night. It was poured into 1000 volumes of dilute hydrochloric acid. The solid product was collected, recrystallized from 50 volumes of acetonitrile and dried. The melting point was 104–5° C.

The mentioned couplers which are more readily diffusible in silver halide emulsion layers can readily be rendered less diffusible by substitution with high molecular weight groups. For example, the pyrazolone coupler VII can be substituted on the 1-phenyl group as follows:

COUPLER VIIa

This compound can be made by starting with 1-(4-nitrophenyl)-3-amino-5-pyrazolone (Porter et al. U.S. 2,376,380, May 22, 1945) instead of 1-phenyl-3-amino-5-pyrazolone in Example VII. Reducing the product thus obtained, by the method given for the preparation of 5-amino-2-heptafluorobutyramidophenol above, and reacting the resulting amine with α-(2,4-di-n-amylphenoxy)-butyryl chloride in the same manner as shown in Example VI.

The related chlorinated couplers 5-pentadecyl-2-trichloroacetamidophenol and 5-methyl-2-trichloroacetamidophenol have been coupled with the developing agents 2-amino-5-diethylaminotoluene and N-ethyl-β-methanesulfonamido-3-methyl-4-aminoaniline. It has been found that similar dyes made from the above fluorinated couplers of the invention have appreciably better light fastness.

In a similar manner other couplers having the above general formula and having a fluoroalkylcarbonamide containing up to about 14 carbon atoms, can be prepared using the perfluoro acid halides described for example by E. Kauck and A. Diesstin, Ind. Eng. Chem., 43, 2332 (1951), such as perfluoro myristyl halides and perfluoro-iso-butyryl halides. Heptafluorobutyryl chloride above can be prepared by an analogous procedure.

It will be apparent from the above description of our invention that the couplers containing the fluoro alkyl carbonamido group include (A) The phenolic hydroxyl couplers, particularly the 2-fluoroalkylcarbonamido phenols and the 2-fluoroalkylcarbonamido-1-naphthols having a coupling position reactive with oxidized color developer.

(B) The open-chain reactive methylene coupler compounds containing the —CO—CH$_2$—CO— group such as a benzoyl acetanilide coupler to which is attached directly or indirectly a fluoroalkylcarbonamido group.

(C) The 5-pyrazolone couplers containing the fluoroalkylcarbonamido group and in which the 4-position is reactive with a color developer, preferably the 3-fluoroalkylcarbonamido-5-pyrazolones.

The coupler compounds of the invention find usage in a wide variety of photographic color processes wherein silver halide emulsions are developed in the presence of the couplers. For example, couplers I, II, VII to XII are most useful in color developing solutions for the development of multilayer color films in which some or all of the emulsion layers are devoid of coupler compounds. A typical color developing solution in which such couplers can be incorporated is as follows:

| | G. |
|---|---|
| 2-amino-5-diethylaminotoluene sulfate | 2.5 |
| Sodium sulfite (anhydrous) | 5 |
| Sodium carbonate (anhydrous) | 20 |
| Potassium bromide | 2 |
| Water to 1000 cc. | |

The couplers can be incorporated into the developer compositions by first dissolving them in a solvent such as isopropyl alcohol and adding this solution to an alkaline developer composition. About 3 grams of the couplers of the invention are suitable for use in developer compositions such as the above.

Color developing solutions thus containing the couplers of the invention are used in well known subtractive color processes. Accordingly, a color film containing at least one emulsion layer and preferably two or three emulsion layers sensitized to different regions of the spectrum is exposed to a subject developed in a black-and-white developer followed by selective reversal exposure and the exposed emulsion layer color developed with the above developing solution containing one of the coupler compounds appropriate for the particular emulsion layer which has been reversal exposed.

The other couplers which are substantially nondiffusing in emulsion layers such as gelatino-silver halide emulsion layers are more appropriate for use in silver halide emulsion layers designed for color processes of the well known negative-positive and reversal types. Accordingly, these less diffusible couplers, for example, couplers No. III, IV to VI and VIII can be dispersed in an emulsion layer such as a gelatino-silver halide emulsion layer by means of coupler solvents including cellulose esters, natural and synthetic resins and organic crystalloidal materials having a boiling point above about 170° C., as described in the Mannes et al. U.S. Patent 2,304,940, granted December 15, 1942, and the Jelley et al. U.S. Patent 2,322,027, granted June 15, 1943. The optimum quantity of coupler to use in the emulsion layer (as in the case of use in a color developer) can be determined by simple experiment and will depend somewhat upon the coupling activity of the particular coupler, the silver halide content of the emulsion layer, the particular process in which the emulsion is to be used and other factors well known in the art of emulsion making.

A typical procedure for making such an emulsion is as follows:

Six-tenths gram of 2-heptafluorobutyramido-5-pentadecylphenol III was dissolved in 1.2 g. of tricresylphosphate by heating to 120° C. with stirring. This solution was mixed with 17.7 ml. of 10% gelatin solution containing 2 ml. of 5% aqueous solution of an alkylnaphthalene sodium sulfonate. The mixture was passed through a colloid mill four times to disperse the coupler solution. Fourteen ml. of water used to rinse out the colloid mill was added to the dispersion, which was then made up to a total of 50 g. with additional water. The dispersion was mixed at 40° C. with 8.5 ml. of a melted silver bromoiodide emulsion of the type described by Trivelli and Smith in the Phot. Jour., vol. 79, pp. 330–31 (1939), and the mixture was coated on a cellulose acetate support. After drying, the coating was exposed under an image and developed in a 2-amino-5-diethylaminotoluene developing composition to form a silver and cyan dye negative image. The silver image and residual silver halide were removed with ferricyanide-hypo bleach leaving a cyan negative image having maximum absorption at a wavelength of 666 mμ.

The color developing agents used for development of emulsion layers in the presence of the novel coupler compounds include the well known primary aromatic amino silver halide developing agents such as the phenylenediamines including the alkyl phenylenediamines and alkyl toluene diamines as well as the p-aminophenols in which the amino group is unsubstituted. The N-alkyl sulfonamido alkyl p-phenylenediamine developing agents of U.S. Patent 2,193,015 are particularly useful for the development of emulsion layers in the presence of the couplers of the invention.

The silver halide component of the emulsion layers is not especially critical and may be, for example, silver bromoiodide, silver bromide or silver chloride, etc., depending upon the results desired. Likewise, the emulsions which are developed in the presence of the novel couplers may consist of single-layer or differentially sensitized multilayer films.

The hydrophilic colloid vehicle of the emulsions may be selected from known types including gelatin, hydrolyzed cellulose esters, polyvinyl alcohol and other natural and synthetic organic colloids.

The examples and compounds set forth in the present specification are illustrative only and it is to be understood that our invention is to be taken as limited only by the scope of the appended claims.

What we claim is:

1. A photographic silver halide emulsion containing a coupler compound of the class consisting of phenolic hydroxyl, 5-pyrazolone and open chain reactive methylene compounds capable of forming a dye with the oxidation product of a primary aromatic amino silver halide developing agent, said coupler having a perfluoroalkylcarbonamido group attached to its molecule in a non-coupling position.

2. A photographic silver halide emulsion containing a phenolic hydroxyl coupler compound capable of forming a dye with the oxidation product of a primary aromatic amino silver halide developing agent, said coupler having a perfluoroalkylcarbonamido group attached to its molecule, in a non-coupling position.

3. A photographic silver halide emulsion containing a 2-perfluoroalkylcarbonamido phenol capable of forming a dye with the oxidation product of a primary aromatic amino silver halide developing agent.

4. A photographic silver halide emulsion containing 2-heptafluorobutyramido-5-[α-(3 - pentadecyl phenoxy)-butyramido]phenol.

5. A photographic silver halide emulsion containing 5-[γ-(2,4-di-n-amylphenoxy)butyramido]-2 - heptafluorobutyramidophenol.

6. A photographic silver halide emulsion containing 5-[γ-(2,4-di-tert.-amylphenoxy)butyramido]-2-heptafluorobutyramidophenol.

7. A photographic silver halide emulsion containing 5-[γ-(2,4-di-n-amylphenoxy)butyramido]-2-trifluoroacetamidophenol.

8. A photographic silver halide emulsion containing 1-phenyl-3-heptafluorobutyramido-5-pyrazolone.

9. A photographic silver halide emulsion containing a coupler compound having the group

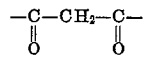

said compound having additionally attached thereto in a non-coupling position a perfluoroalkyl carbonamido group.

10. A photographic silver halide emulsion containing a 5-pyrazolone coupler compound to whose molecule is attached a perfluoroalkylcarbonamido group in a non-coupling position.

11. A photographic silver halide emulsion containing a 3-perfluoroalkylcarbonamido-5-pyrazolone coupler compound.

12. A color-forming photographic developer composition comprising a primary aromatic amino silver halide developing agent and a coupler compound of the class consisting of phenolic hydroxyl, 5-pyrazolone and open chain reactive methylene compounds capable of forming a dye with the oxidation product of said developing agent, said coupler having a perfluoroalkylcarbonamido group attached to its molecule in a non-coupling position.

13. A color-forming photographic developer composition comprising a primary aromatic amino silver halide developing agent and a phenolic hydroxyl coupler compound capable of forming a dye with the oxidation product of said developing agent, said coupler having a perfluoroalkylcarbonamido group attached to its molecule in a non-coupling position.

14. A color-forming photographic developer composition comprising a primary aromatic amino silver halide developing agent and a coupler compound having the group

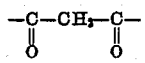

said compound having additionally attached thereto in a non-coupling position a perfluorocarbonamido group.

15. A color-forming photographic developer composition comprising a primary aromatic amino silver halide developing agent and a 5-pyrazolone coupler compound to whose molecule is attached a perfluoroalkylcarbonamido group in a non-coupling position.

16. A method of producing a colored photographic image in a developable silver halide emulsion layer which comprises developing said layer in the presence of a coupler compound of the class consisting of phenolic hydroxyl, 5-pyrazolone and open chain reactive methylene compounds capable of forming a dye with the oxidation product of a primary aromatic amino silver halide developing agent, said coupler having a perfluoroalkylcarbonamido group attached to its molecule in a non-coupling position.

17. A method of producing a colored photographic image in a developable silver halide emulsion layer which comprises developing said layer in the presence of a phenolic hydroxyl coupler compound capable of forming a dye with the oxidation product of said developing agent, said coupler having a perfluoroalkylcarbonamido group attached to its molecule in a non-coupling position.

18. A method of producing a colored photographic image in a developable silver halide emulsion layer which comprises developing said layer in the presence of a coupler compound having the group

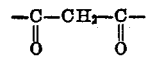

said compound having additionally attached thereto in a non-coupling position a perfluoroalkylcarbonamido group.

19. A method of producing a colored photographic image in a developable silver halide emulsion layer which comprises developing said layer in the presence of a 5-pyrazolone coupler compound to whose molecule is attached a perfluoroalkylcarbonamido group in a non-coupling position.

References Cited in the file of this patent

UNITED STATES PATENTS 2,369,489   Porter et al. _____ Feb. 13, 1945

OTHER REFERENCES

"The Van Nostrand Chemist's Dictionary," pages 516 and 517 (1953), The D. Van Nostrand Co., Inc., publishers, New York, N.Y.